J. C. ANDERSON.
PROPORTIONAL METER.
APPLICATION FILED JUNE 15, 1903. RENEWED MAR. 30, 1909.
940,114.
Patented Nov. 16, 1909.
2 SHEETS—SHEET 1.
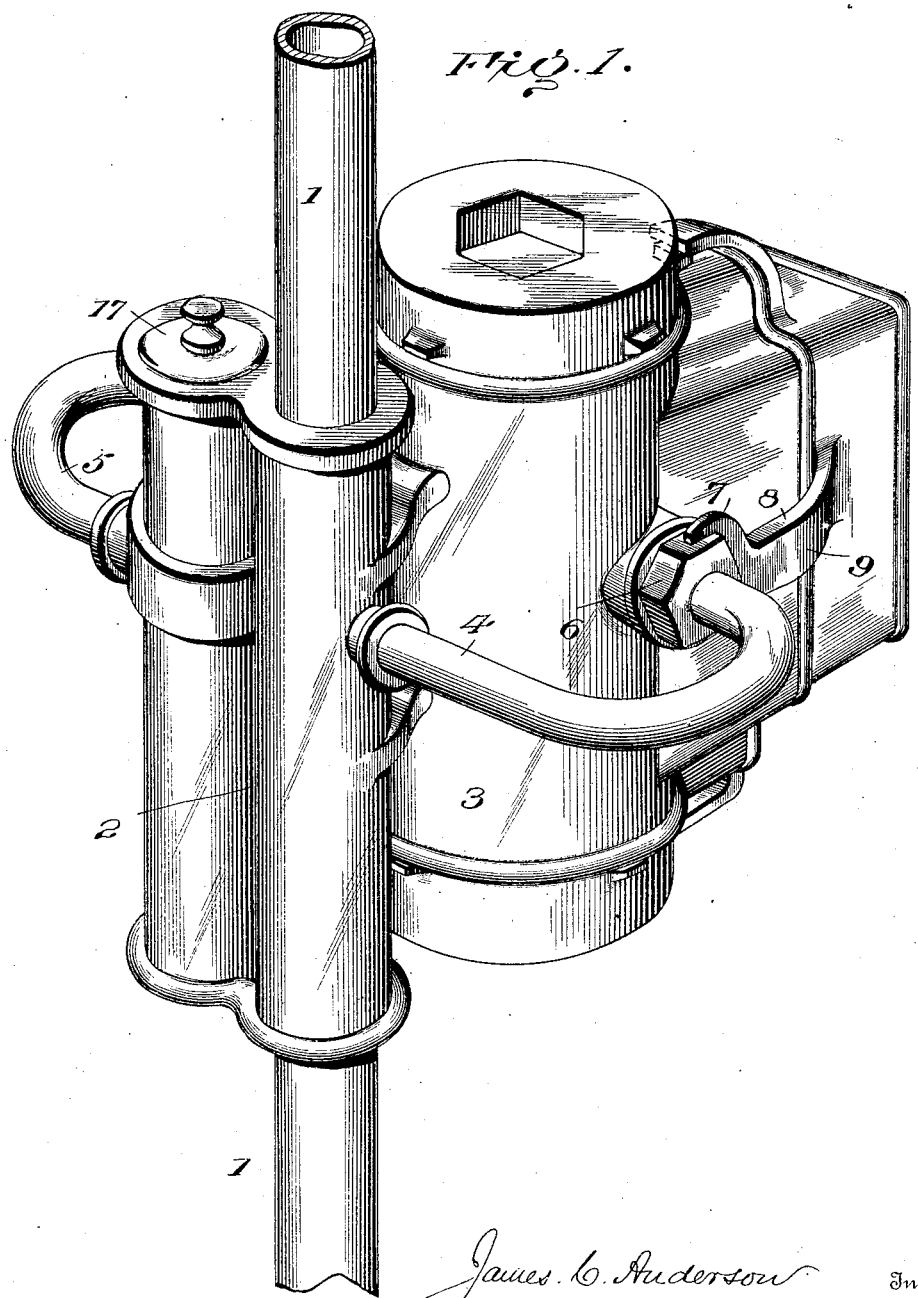

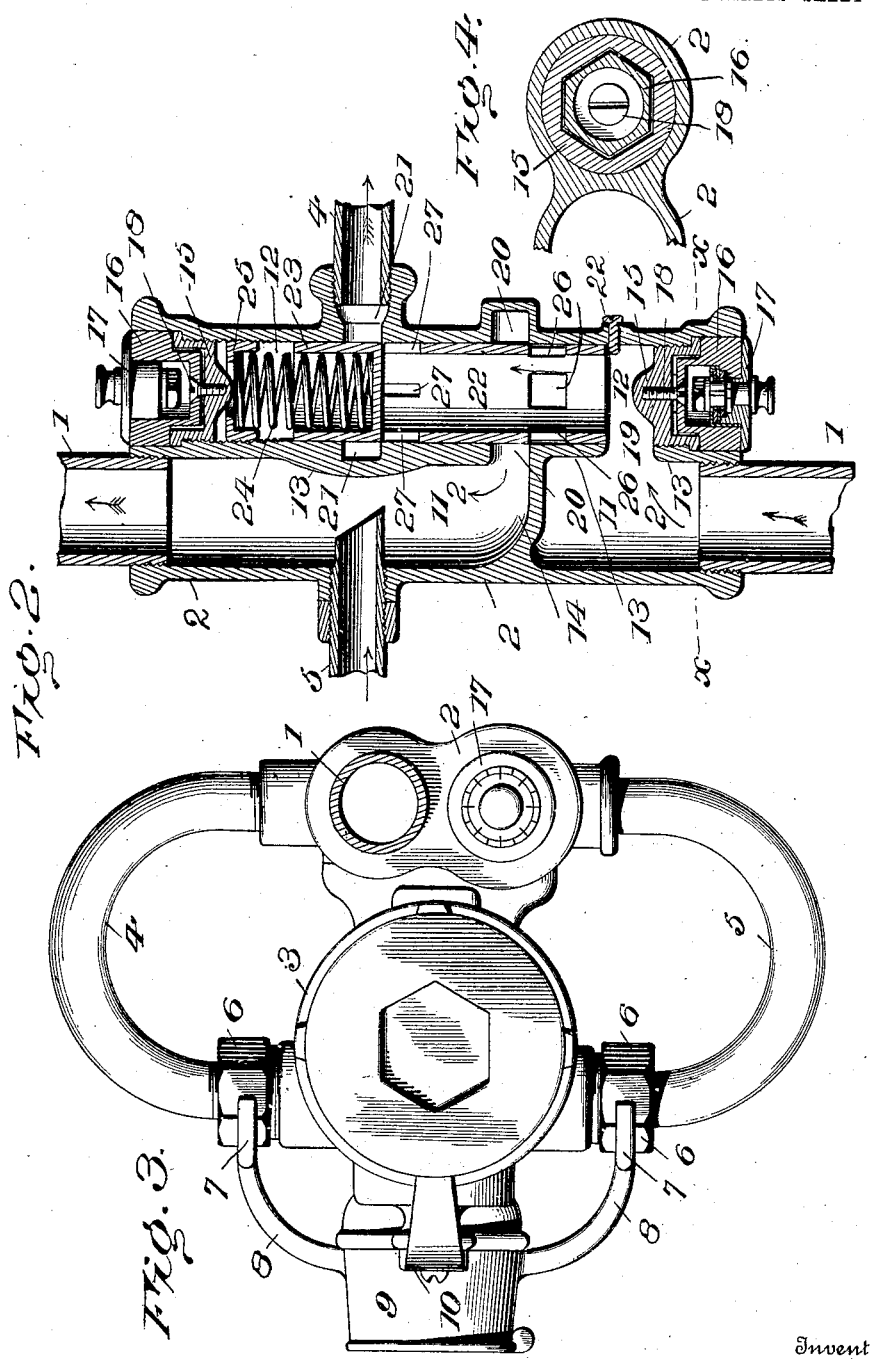

UNITED STATES PATENT OFFICE.

JAMES C. ANDERSON, OF HIGHLAND PARK, ILLINOIS.

PROPORTIONAL METER.

940,114.

Specification of Letters Patent.

Patented Nov. 16, 1909.

Application filed June 15, 1903, Serial No. 161,564. Renewed March 30, 1909. Serial No. 486,815.

*To all whom it may concern:*

Be it known that I, JAMES C. ANDERSON, a citizen of the United States, residing at Highland Park, in the county of Lake and State of Illinois, have invented certain new and useful Improvements in Proportional Meters; and I do hereby declare the following to be a full, clear, and exact description of the invention, such as will enable others skilled in the art to which it appertains to make and use the same.

My invention relates to certain new and useful improvements in means for determining the quantity of water passing through a main or conduit of a given area in cross section by accurately measuring a proportionate quantity of the whole body of water.

Many attempts have been made to accomplish this result by improvements in that class of meters denominated as proportional meters, but so far as I am aware the measurements made by such meters have been inaccurate and unreliable.

My invention has for its object to divert from the main body or column of water a proportionate quantity thereof, and to deliver said quantity to a measuring meter and then return it to the main body or column of water so that the path traversed by the diverted column of water through the meter and back to the main body or column shall be the one of least resistance, thus establishing uniform action of the meter and consequently accurate measurements thereby.

With this end in view my invention consists in the combination with a water main or supply pipe and a measuring meter, of an auxiliary passage or coupling, intermediate of the supply pipe and meter, and so constructed and arranged with reference to the meter and the supply pipe that the flow of liquid under pressure will be proportionately divided between the main conduit or pipe and the registering meter and the natural trend of the fluid in the direction of least resistance shall be through the meter and back to the main conduit and across the path of the column of water passing through the auxiliary passage in such manner that its delivery to the main conduit shall operate to eliminate at such locality, the retardation of flow which would otherwise result from the restriction in the main passage, thus establishing equilibrium or balance between the divided columns of fluid at the sphere of their convergence and delivery to the main pipe beyond the point of delivery from the meter.

My invention further consists in the details of construction and arrangement whereby the auxiliary device may be readily adjusted to compensate for different or varying heads of pressure of the liquid all as will be hereinafter more fully explained.

In order that those skilled in the art to which my invention appertains may know how to make and apply my improvement and fully understand its construction and operation, I will preceed to describe the same, referring by numerals to the accompanying drawings, in which, Figure 1, represents in perspective my improved auxiliary fluid passage, interposed between an ordinary main or supply pipe, and a meter in such manner that the traverse of a proportional quantity of the liquid through the meter, will accurately record the amount of liquid passed through the main or supply pipe. Fig. 2, is a central vertical section of the auxiliary passage or coupling, connected with the main or supply pipe and showing the inlet and exit connection of the meter with said auxiliary passage or coupling, one of the locks or closures being shown partially in elevation. Fig. 3, is a top or plan view of the relation of the parts as shown in perspective at Fig. 1, and Fig. 4, is a detail section taken on the line $x$—$x$ of Fig. 2, through the locking device employed to close either end of the auxiliary passage or coupling and to guard against any fraudulent manipulation of the inclosed movable parts thereof.

In the drawings, the meter shown is preferably such as is illustrated and described in Letters Patent No. 711,192, granted to me, October 14th, 1902, and the locking mechanism shown at Figs. 2 and 4 is such as is illustrated and described in Letters Patent No. 711,191, granted to me on the same date.

At Figs. 1 and 3, I have shown and will hereinafter describe, means for preventing the changing of the established and proper relation between the meter and the auxiliary liquid passage, and means for preventing the removal of the heads of the meter cylinder, which devices and their combination and arrangement with the auxiliary liquid passage constitute the subject matter of an application filed concurrently herewith and bearing Serial No. 161565.

Referring to the accompanying drawings, 1 represents the main conduit or pipe through which the liquid to be measured flows, 2 is the auxiliary liquid passage or coupling to which the main pipe 1 is connected at each end by an ordinary screw joint, as clearly shown at Fig. 2, and 3 is a meter such as that shown in my Letters Patent No. 711,192, or one of any other suitable construction. The meter shown is connected with the auxiliary passage or coupling by pipes 4 and 5. The pipe 4 is an inlet pipe between the auxiliary passage or coupling 2 and the meter 3, and 5 is a pipe leading from the opposite side of the meter back to the auxiliary passage or coupling. These pipes 4 and 5 are connected with the auxiliary passage or coupling by ordinary screw joints as shown at Fig. 2, and they are connected with the inlet and outlet screw nipples on opposite sides of the meter cylinder by polygonal nuts 6 which are embraced by forks 7 on yokes or arms 8, integral with the cap or cover 9 of the register mechanism of the meter 3 which is secured in position by a lock 10, such as described in my Letters Patent No. 711,191, hereinbefore referred to, and consequently when the pipes 4 and 5 are in position to connect the meter with the auxiliary passage and the cap or cover is locked in position, the established relation of the parts cannot be fraudulently changed as is more fully and in detail explained in the application filed of even date herewith and hereinbefore referred to.

Referring now more particularly to Fig. 2, the auxiliary passage or coupling consists of two longitudinal parallel channels 11 and 12, separated by a wall or partition 13, and the primary channel 11 is closed by a transverse or horizontal wall or closure 14. The secondary channel 12 is closed at each end by an internal threaded nut or head 15, to which the part 16 of the lock 17 is connected by a screw 18, so that when the lock is turned to prevent access to the screw 18, entrance to the channel 12 is barred. The vertical or longitudinal partition or wall 13, below the transverse wall or closure 14, is provided with an opening or gateway 19 communicating with the channel 12, and the hollow controller or valve 22. The wall 13 is also formed with communication 20 above the closure 14. The channel 12 is formed with an annular passage 21, communicating with the meter inlet pipe 4.

Within the channel 12 is located a tubular reciprocatory piston valve or controller 22 formed at one end with a pocket or seat 23 for a spiral spring 24, the tension of which is adjusted by means of a threaded ring or cup 25 in an obvious manner. The purpose of the threaded ring or cup 25 is to adjust the tension of the spring 24, to the head or pressure of the liquid passing through the main conduit.

The valve or controller 22 is provided with peripheral openings 26 and 27, adapted to register respectively with the annular communication 20 and with the annular passage 21, and the number and area of the peripheral openings 26 and 27, are so proportioned to each other that when the head or pressure of the liquid forces the valve or controller 22 in the direction of the arrow 1 to register the openings 26 and 27 with the communication 20 and the annular passage 21, there will be a proportionate division of the liquid passed respectively through the communication 20 and the annular passage 21, that portion passing through 20 going to the primary channel 11, and that portion passing to the passage 21, traveling through the pipe 4 to the meter to operate the register thereof and passing from the opposite side of the meter through the pipe 5 to the primary channel 11, above the horizontal wall or closure 14.

22$^\times$ is a pin or screw passing through the coupling 2, and projecting therein a suitable distance to constitute a stop to arrest the valve or controller when it has reached the point of cut off.

The pipe 5 projects within the channel 11 and constitutes a restriction of said channel 11, so that the liquid passed through the communication 20 will, in traversing the course indicated by the arrows 2, be restricted in such manner as to produce a partial vacuum at the plane of restriction, of such character as to produce a suction or pulling action upon the liquid delivered by the pipe 5.

The valve or controller 22 is so adjusted and set by the tension of the spring 24, that a slight lead is given to the liquid through the peripheral openings 27 and the pipe 4 to the meter, thus establishing this course as the one of least resistance, which is maintained and augmented by the passage of the main or larger body of liquid passing through the channel 11, at the plane where the exit pipe 5 from the meter enters, as heretofore explained.

The aggregate area of the peripheral openings 26 is equal to the area of the passage 11, at the locality where the outlet pipe 5 from the meter projects into said passage 11, and the aggregate area of the peripheral openings 27 is equal to the area of the inlet and outlet pipes 4 and 5 of the meter. This relation as to area, between the peripheral openings 26 and 27, respectively, with the area of the passage 11, at the restricted locality, and inlet and outlet pipes 4 and 5 of the meter, proportionately divides the main column of water passed through the main pipe or conduit 1. This proportionate relation between the peripheral openings 26 and 27 and the restricted portion of the passage 11, and the inlet and outlet pipes 4 and 5 of the meter, as will be readily understood, will enable a meter of a given size to be used in connection with main pipes or conduits of different areas. The aggregate area of the openings 26 and 27 may be secured either by the size or the number of such openings.

In the construction shown at Fig. 2, the number of these openings are four each, and the individual openings 26 are shown as having three times the area of the individual openings 27, from which condition it will be understood that one-fourth of the supply of water delivered by the main or conduit 1, is deflected and passed through the meter to be measured thereby, and the other three-fourths is returned above the horizontal closure 14, to the channel 11. When the same meter is used in connection with a larger main or conduit and a correspondingly larger auxiliary liquid passage 2, the area of the peripheral openings 27 are the same as those shown in Fig. 2, but the area of the peripheral openings 26 is enlarged to correspond with differences of area between the main or conduit and its auxiliary passage and the inlet and outlet pipes 4 and 5 of the meter so that the water measured by the meter will be the same in both cases, and differing only in proportion with reference to the varying size or area of the main or conduit and its auxiliary passage.

When the area of the openings 26 is increased for the purpose and under the circumstances named, I prefer that this increase of area shall be secured by increasing the number of the openings 26 rather than the size of the individual openings, in order that the friction produced by the passage of the water through the openings 26 and 27, shall be uniform. This idea as will be seen involves making the number of the individual openings 26, an exact multiple of the number of the openings 27 in order to secure exact differentiation as to the quantities of water passed through the respective individual openings (and consequently like differentiation as to the aggregate quantities of water passed through the respective openings), and at the same time equalizes the friction in each case.

It will be understood that the areas of the gateway 19 and communicating passage 20 are equal to the area of the main conduit or pipe 1, so that there will be no restriction or retardation of the flow of the liquid except at the plane where the exit pipe 5 from the meter 3 projects into the channel 11.

While I have shown the longitudinal partition or wall 13 as swelled at the plane of the annular passage 21, and prefer such construction both as a matter of strength and as supplementing the stricture produced by the projection of the pipe 5 into the channel 11, it will be understood that this wall 13 may be of the same thickness throughout its entirety.

By the employment of the locks or closures composed of the parts 15, 16 and 17, it will be seen that the channel 12, may be readily machined to accurately receive the controller or valve 22, and the ring or cup 25 and that the parts may be easily and accurately assembled and adjusted.

Having described the construction and operation of my improved means for determining the quantity of water passing through a main or conduit of any given area by diverting and measuring a proportionate quantity of said water and explained its advantages, what I claim as new and desire to secure by Letters Patent is:

1. In combination with a main or conduit of a given area, and a measuring meter of less capacity than the main or conduit, an intermediate coupling having one passage of substantially equal area with the main or conduit and communicating with the outlet pipe of the meter, and a secondary passage communicating with the inlet pipe of the meter and also with the main passage, said two passages separated by a horizontal wall in the main passage, and means located in the secondary passage for automatically directing proportionate quantities of water back to the primary passage, and to and through the meter, substantially as set forth.

2. In combination with a main or conduit and an independent measuring meter, a coupling intermediate the main or conduit and the meter and formed with adjacent communicating water passages; a reciprocating valve located in one of said water passages and adapted to be operated in one direction by the pressure of the water in the main, and to be adjustably balanced in the opposite direction; a pipe leading from the passage in which the valve is located to one side of the meter; and a pipe leading from the opposite side of the meter and entering the primary water passage of the coupling at substantially a right angle thereto, substantially as hereinbefore set forth.

3. In combination with a main or conduit and a measuring meter, a coupling intermediate the main or conduit and the meter and communicating with the meter, a controller or valve located in the coupler and adapted to be operated by the pressure of the water in the main or conduit to direct proportionate quantities of water back to the main or conduit and to and through the measuring meter, means for moving the valve in opposition to the pressure, and means for adjusting the valve to varying pressures in the main or conduit, substantially as set forth.

4. In combination with a main or conduit and a measuring meter; a coupling intermediate the main or conduit and the meter; means for proportionately dividing the quantity of water flowing through the main or conduit; a pipe leading from the coupling to the meter to deliver a proportionate quantity of water to be measured; and a pipe leading from the meter back to the coupling and having its delivery end projecting into the coupling and transverse to the axis of the coupling, whereby the current of water delivered therefrom is directed across the current of water flowing through the coupling, substantially as hereinbefore set forth.

5. In a coupling such as described and in combination with a main or conduit and a measuring meter, a reciprocating piston valve adapted to be operated by the pressure within the main and located within a seat in the coupling, a spring for adjusting the valve to the pressures exerted upon it, and means for varying the tension of the spring, substantially as and for the purpose set forth.

6. In a coupling such as described and having a primary and a secondary passage for the flow of water under pressure and communicating with one another, and the secondary passage communicating with an independent measuring meter; an adjustable spring controlled reciprocating valve located in the secondary water passage and provided with ports adapted to register with passages leading to the primary passage of the coupling and to a conduit leading from the auxiliary passage, to one side of a measuring meter, substantially as set forth.

7. In a coupling such as described and combined with a main or conduit and a measuring meter, a hollow reciprocating piston valve provided with proportional ports registrable with corresponding passages in the coupling in combination with an adjusting spring at one end of the valve, and means for controlling the tension of the spring, substantially as hereinbefore set forth.

8. A coupling such as described for use in connection with a main or conduit and a measuring meter, having parallel channels or passages adjacent to one another and separated by a vertical wall or partition, a transverse wall or closure in the primary channel or passage, a communication between the parallel channels above the transverse wall or closure, an annular passage in the secondary channel or passage, and a pressure controlled piston valve provided with peripheral ports adapted to be brought into register with the communicating passage between the parallel passages of the coupling and with the annular passage in the secondary channel, substantially as and for the purpose set forth.

In testimony whereof I affix my signature, in presence of two witnesses.

JAMES C. ANDERSON.

Witnesses:
D. G. STUART,
JNO. J. HARROWER.